(12) United States Patent
Matsuda et al.

(10) Patent No.: US 10,310,188 B2
(45) Date of Patent: Jun. 4, 2019

(54) OPTICAL CONNECTOR, OPTICAL FIBER CONNECTION DEVICE, OPTICAL CONNECTOR MANUFACTURING METHOD, AND OPTICAL FIBER CONNECTION METHOD

(71) Applicant: FUJIKURA LTD., Tokyo (JP)

(72) Inventors: Takaharu Matsuda, Chiba (JP); Hung Huu Luong, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/777,517

(22) PCT Filed: Nov. 17, 2016

(86) PCT No.: PCT/JP2016/084114
§ 371 (c)(1),
(2) Date: May 18, 2018

(87) PCT Pub. No.: WO2017/086390
PCT Pub. Date: May 26, 2017

(65) Prior Publication Data
US 2018/0329148 A1 Nov. 15, 2018

(30) Foreign Application Priority Data
Nov. 19, 2015 (JP) .................................. 2015-226347

(51) Int. Cl.
*G02B 6/255* (2006.01)
*G02B 6/38* (2006.01)
(Continued)

(52) U.S. Cl.
CPC ............. *G02B 6/3803* (2013.01); *G02B 6/24* (2013.01); *G02B 6/26* (2013.01); *G02B 6/38* (2013.01)

(58) Field of Classification Search
CPC .. G02B 6/2551; G02B 6/3846; G02B 6/2558; G02B 6/255; G02B 6/2555
See application file for complete search history.

(56) References Cited

U.S. PATENT DOCUMENTS

| | | | |
|---|---|---|---|
| 8,408,814 B2 | 4/2013 | Sumida et al. | |
| 2011/0110630 A1 | 5/2011 | Hashimoto | |

(Continued)

FOREIGN PATENT DOCUMENTS

| AU | 2015232529 B2 | 6/2017 | |
|---|---|---|---|
| CA | 2942644 A1 * | 9/2015 | ............. G02B 6/382 |

(Continued)

OTHER PUBLICATIONS

Office Action issued in corresponding to Japanese Patent Application No. 2015-226347, dated Dec. 11, 2018 (5 pages).

*Primary Examiner* — Jennifer Doan
(74) *Attorney, Agent, or Firm* — Osha Liang LLP (57) ABSTRACT

An optical connector includes a ferrule, a first optical fiber retained in the ferrule, a clamp section including an insertion section where a second optical fiber is inserted, a solid index-matching material disposed on an end face of the first optical fiber on an insertion section side, and a projecting portion on the end face of the first optical fiber and that projects more toward the insertion section side than a central region of the end face. The clamp section centers and fixes the first optical fiber and the second optical fiber.

11 Claims, 8 Drawing Sheets

(51) Int. Cl.
   *G02B 6/24*   (2006.01)
   *G02B 6/26*   (2006.01)

(56) References Cited

U.S. PATENT DOCUMENTS

| | | |
|---|---|---|
| 2011/0293222 A1 | 12/2011 | Sumida et al. |
| 2017/0123162 A1 | 5/2017 | Matsuda et al. |
| 2017/0139148 A1 | 5/2017 | Yamaguchi et al. |
| 2018/0308315 A1* | 10/2018 | Amaitis .............. G07F 17/3244 |

FOREIGN PATENT DOCUMENTS

| | | |
|---|---|---|
| EP | 2296024 A1 | 3/2011 |
| EP | 3121629 A1 | 1/2017 |
| JP | H02-111905 A | 4/1990 |
| JP | 2010-237330 A | 10/2010 |
| JP | 2011-033731 A | 2/2011 |
| JP | 2015-176076 A | 10/2015 |
| JP | 2015-197608 A | 11/2015 |
| WO | 2009-153930 A1 | 12/2009 |
| WO | 2010/092654 A1 | 8/2010 |

\* cited by examiner

FIG. 4C (COMPARATIVE EXAMPLE)

FIG. 7B (COMPARATIVE EXAMPLE)

FIG. 8A (EXAMPLE WITH ROUNDED EDGES)

FIG. 8B (EXAMPLE WITH INDENTED SHAPE)

OPTICAL CONNECTOR, OPTICAL FIBER CONNECTION DEVICE, OPTICAL CONNECTOR MANUFACTURING METHOD, AND OPTICAL FIBER CONNECTION METHOD

TECHNICAL FIELD

The present invention relates to an optical connector, an optical fiber connection device, an optical connector manufacturing method, and an optical fiber connection method.

BACKGROUND

On-site-assembly type optical connectors are one example of known devices for connecting optical fibers by abutting end faces of the optical fibers against each other. On-site-assembly type optical connectors are optical connectors being structured to enable easy assembly to optical cable terminals at sites where optical fibers are being laid. An in-built fiber that is already factory-installed is attached to a ferrule of an optical connector before assembly, and an end portion of the in-built fiber is placed in a clamp section (mechanical splicer section). At the site of assembly operations, the end portion of a cut insertion fiber is inserted into the clamp section of the on-site-assembly type optical connector, and the in-built fiber and the insertion fiber are optically connected by the end faces of the in-built fiber and the insertion fiber being abutted against each other in the clamp section and both of the fibers being fixed.

A liquid index-matching material is generally pre-introduced into the clamp section, which serves as the section where the optical fibers are connected, in order to suppress connection loss (see, for example, FIG. 16 of Patent Literature 1). However, sometimes air bubbles remain in the connection section even when the optical fiber connection section is coated in the liquid index-matching material. Thus, in the on-site-assembly type optical connector of Patent Literature 1, a solid index-matching material is preset on the end face of the in-built fiber, and the end faces of the optical fibers are connected together through the solid index-matching material (see FIG. 7 of Patent Literature 1).

Patent Literature

Patent Literature 1: Japanese Patent Application Publication No. 2011-33731

SUMMARY

In Patent Literature 1, the end face of the in-built fiber is a flat face perpendicular to the optical axis. Moreover, although there are slight irregularities due to low accuracy from on-site cutting, the end face of the insertion fiber is also substantially perpendicular to the optical axis. There is accordingly a large deformation in the solid index-matching material interposed between the end faces that are perpendicular to the optical axis when the end faces are abutted against each other. As a result, the original shape of the solid index-matching material is not maintained, and the desired characteristics of the solid index-matching material are no longer obtainable. Note that such a deformation cannot arise with a liquid index-matching material, and the deformation is particular to cases in which a solid index-matching material is employed.

One or more embodiments of the invention suppress the amount of deformation of a solid index-matching material when end faces of optical fibers are abutted against each other.

One or more embodiments of the invention are directed to an optical connector including a ferrule, a first optical fiber retained in the ferrule, and a clamp section. The clamp section includes an insertion section configured to have a second optical fiber inserted therein, and centers and fixes the first optical fiber and the second optical fiber. A solid index-matching material is provided on an end face on the insertion section side of the first optical fiber, and a projecting portion is formed on the end face of the first optical fiber so as to project more toward the insertion section side than a central region of the end face.

Other features of the invention will be made clear by the following description of the present specification and the accompanying drawings.

According to one or more embodiments of the invention, an amount of deformation of a solid index-matching material, when end faces of optical fibers are abutted against each other, can be suppressed.

DETAILED DESCRIPTION

At least the following matters will be made clear by the following description of embodiments of the present invention, with reference to the accompanying drawings.

An optical connector in accordance with one or more embodiments includes a ferrule, a first optical fiber retained in the ferrule, and a clamp section. The clamp section includes an insertion section configured to have a second optical fiber inserted therein, and centers and fixes the first optical fiber and the second optical fiber. A solid index-matching material is provided on an end face on the insertion section side of the first optical fiber. A projecting portion is formed on the end face of the first optical fiber so as to project more toward the insertion section side than a central region of the end face. According to such an optical connector, the amount of deformation of the solid index-matching material at the central region of the end face of the first optical fiber can be suppressed, due to being able to secure a separation to the end face of the second optical fiber at the central region of the end face of the first optical fiber.

According to one or more embodiments, the end face of the first optical fiber is inclined with respect to a plane perpendicular to an optical axis. This enables easy forming of the projecting portion on the end face of the first optical fiber.

According to one or more embodiments, the end face of the first optical fiber is inclined at an angle of from 4 degrees to 15 degrees, inclusive, with respect to the plane perpendicular to the optical axis. This is because, were the angle to be less than 4 degrees, then deformation force of the solid index-matching material would be large, and were the angle to be greater than 15 degrees, then it would be difficult to produce the inclined end face, and the distance between the end faces would also be too wide.

According to one or more embodiments, the clamp section includes a base member including a centering groove, and a lid member configured to press the first optical fiber and the second optical fiber toward the centering groove. An end portion of the first optical fiber is disposed in the centering groove, and the projecting portion is disposed at the lid member side as viewed from the central region. This enables damage to the solid index-matching material by the edge of the end face of the second optical fiber to be suppressed even if the second optical fiber lifts away from the centering groove prior to fixing by the clamp section.

According to one or more embodiments, a central region of the solid index-matching material projects out further than a peripheral edge region of the solid index-matching material. This enables connection loss to be suppressed, due to the solid index-matching material being able to reliably make contact with the core layer of the second optical fiber.

According to one or more embodiments, the solid index-matching material projects more toward the insertion section side than the projecting portion. This enables the solid index-matching material to fill the central region between the end faces of the optical fibers.

According to one or more embodiments, an edge of the projecting portion is rounded over. This enables impact when abutting to be alleviated.

According to one or more embodiments, the thickness of the solid index-matching material on an optical axis of the first optical fiber is 20 μm or greater. This enables the solid index-matching material to fill the central region between the end faces of the optical fibers.

According to one or more embodiments, the thickness and a hardness of the solid index-matching material lies within a range bounded by four points: (thickness: 20 μm, shore hardness E: 30), (thickness: 20 μm, shore hardness E: 85), (thickness: 40 μm, shore hardness E: 85), and (thickness: 60 μm, shore hardness E: 30). This enables connection loss to be suppressed, and enables alleviation of impact when abutting to be realized.

An optical fiber connection device in accordance with one or more embodiments includes a ferrule, a first optical fiber retained in the ferrule, and a clamp section including an insertion section configured to have a second optical fiber inserted therein, and centering and fixing the first optical fiber and the second optical fiber. A solid index-matching material is provided on an end face on the insertion section side of the first optical fiber. A projecting portion is formed on the end face of the first optical fiber so as to project more toward the insertion section side than a central region of the end face. Such an optical fiber connection device enables the amount of deformation of the solid index-matching material at the central region of the end face of the first fiber to be suppressed, due to securing a separation to the end face of the second fiber at the central region of the end face of the first fiber.

An optical connector manufacturing method in accordance with one or more embodiments includes: providing an unassembled optical connector that includes a ferrule, a first optical fiber retained in the ferrule, and a clamp section; inserting a second optical fiber into the clamp section through an insertion section, and abutting an end face of the first optical fiber and an end face of the second optical fiber against each other; and fixing the first optical fiber and the second optical fiber using the clamp section after the first optical fiber and the second optical fiber have been abutted against each other. A solid index-matching material is provided on an end face on the insertion section side of the first optical fiber. A projecting portion is formed on the end face of the first optical fiber so as to project more toward the insertion section side than a central region of the end face. According to such an optical connector manufacturing method, the amount of deformation of the solid index-matching material at the central region of the end face of the first fiber can be suppressed, due to securing a separation to the end face of the second fiber at the central region of the end face of the first fiber.

An optical fiber connection method in accordance with one or more embodiments includes: abutting an end face of a first optical fiber and an end face of a second optical fiber, which has been inserted into a clamp section through and insertion section, against each other; and fixing the first optical fiber and the second optical fiber using the clamp section after the first optical fiber and the second optical fiber have been abutted against each other. The solid index-matching material is provided on an end face on the insertion section side of the first optical fiber. The projecting portion is formed on the end face of the first optical fiber so as to project more toward the insertion section side than a central region of the end face. According to such an optical fiber connection method, the amount of deformation of the solid index-matching material at the central region of the end face of the first fiber can be suppressed, due to securing a separation to the end face of the second fiber at the central region of the end face of the first fiber.

<Basic Structure of Optical Connector 100>

Figure 1:
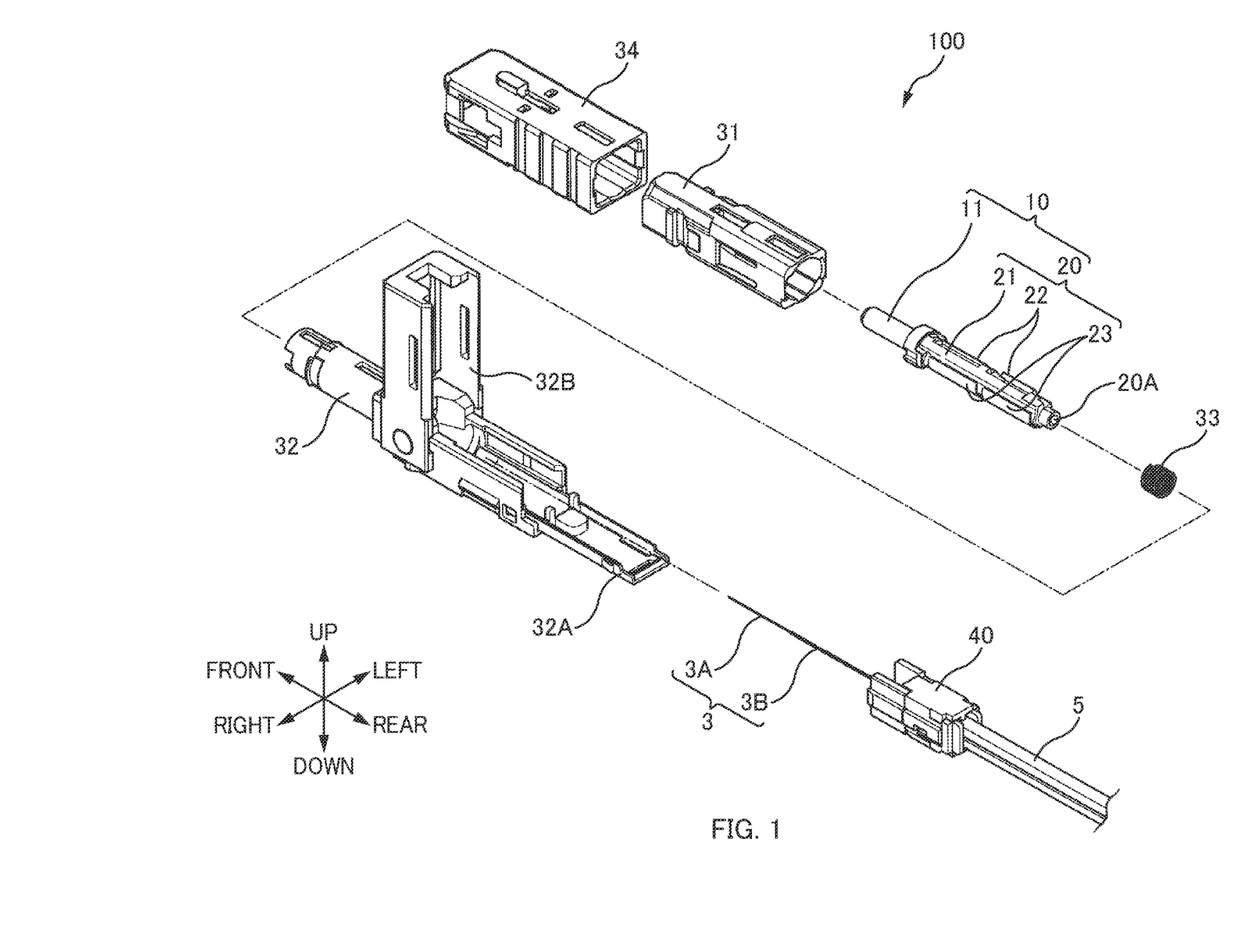
FIG. 1 is an exploded diagram of an optical connector 100 according to one or more embodiments.

FIG. 1 is an exploded diagram of an optical connector 100 in accordance with one or more embodiments.

In the following description, each direction is defined as shown in FIG. 1. Namely, the "front-rear direction" is defined as being an optical axis direction of an optical fiber, "front" is defined as the side of an end face of a ferrule 11, and "rear" is the opposite side thereto (the side of an insertion section 20A, the side of an optical cable 5). Moreover, the "up-down direction" is defined as being a direction perpendicular to a placement face of an insertion support slider 32A of a rear-side housing 32, "up" is defined as being the side an external covering gripping member 40 is placed, as viewed from the placement face, and "down" is defined as the opposite side thereto. Moreover, the "left-right direction" is defined as being a direction perpendicular to the front-rear direction and the up-down direction, with "right" defined as the right side and "left" as the left side when viewed from the rear toward the front.

The optical connector 100 is an on-site-assembly type optical connector for connecting optical fibers together using a mechanical splicing method, and is an optical connector to be assembled to a terminal of the optical cable 5. The optical connector 100 is, for example, an SC type optical connector (an F04 type optical connector as defined by JIS C5973). The optical connector 100 includes a clamp-section-attached ferrule 10. The structure of the clamp-section-attached ferrule 10 is described later.

Prior to assembly, the optical connector 100 includes, as well as the clamp-section-attached ferrule 10, a front-side housing 31 (plug frame), a rear-side housing 32, a spring 33, and a grip 34. The front-side housing 31 and the rear-side housing 32 configure a housing to house the clamp-section-attached ferrule 10. The front-side housing 31 is attached to the rear-side housing 32. The clamp-section-attached ferrule 10 is housed so as to be capable of retracting while being biased toward the front-side with respect to the rear-side housing 32 by the spring 33. The rear-side housing 32 functions as a stop ring that contacts a rear end of the spring 33. An insertion support slider 32A and a cover 32B are provided at the rear of the rear-side housing 32. The insertion support slider 32A is a member to mount an external covering gripping member 40 gripping the external covering of the optical cable 5 onto. The insertion support slider 32A enables the external covering gripping member 40 (and the insertion fiber 3) to slide toward the front. The cover 32B houses the external covering gripping member 40 between the cover 32B and the insertion support slider 32A, and is a member that restricts retraction of the external covering gripping member 40. The grip 34 is a sleeve shaped member (coupling). The front-side housing 31 that will serve as a plug frame is attached to the inside of the grip 34. An insertion hole is formed through an upper portion of the front-side housing 31 (and the grip 34) and the rear-side housing 32. An interposer (not illustrated in the drawings) is inserted through this through hole so as to open or close a clamp section 20 (mechanical splicer section) of the clamp-section-attached ferrule 10.

The insertion fiber 3 is an optical fiber that leads out from the optical cable 5 (for example, a drop cable, an indoor cable, or the like). An end portion of the insertion fiber 3 is cut after stripping off the covering, such that a predetermined dimension of the insertion fiber 3 (a bare optical fiber portion 3A and a covered portion 3B) extends out toward the front from the external covering gripping member 40, and a predetermined dimension of the bare optical fiber portion 3A is provided at the end portion of the insertion fiber 3.

During an operation to assemble the optical connector 100, an operator places the external covering gripping member 40 that is gripping the external covering of the optical cable 5 on the insertion support slider 32A. The operator then feeds the insertion fiber 3 into the clamp section 20 (the mechanical splicer section) by sliding the external covering gripping member 40 forward on the insertion support slider 32A. The end face of the in-built fiber 1 that has been pre-inserted and fixed inside the ferrule 11, and the end face of the insertion fiber 3 at the inside of the clamp section 20, are thereby abutted against each other. Note that when feeding the insertion fiber 3 into the clamp section 20, a wedge shaped interposer (not illustrated in the drawings) is pre-inserted into the clamp section 20, and a gap inside the clamp section 20 (a gap between abase member 21 and a lid member 22) is widened. After the in-built fiber 1 and the insertion fiber 3 have been abutted, the in-built fiber 1 and the insertion fiber 3 are fixed in the clamp section 20 by removing the interposer from the clamp section 20. Moreover, the external covering gripping member 40 (and the optical cable 5) is fixed to the rear-side housing 32 when the cover 32B of the rear-side housing 32 is lowered.

<Basic Structure of Clamp-Section-Attached Ferrule 10>

Figure 2:
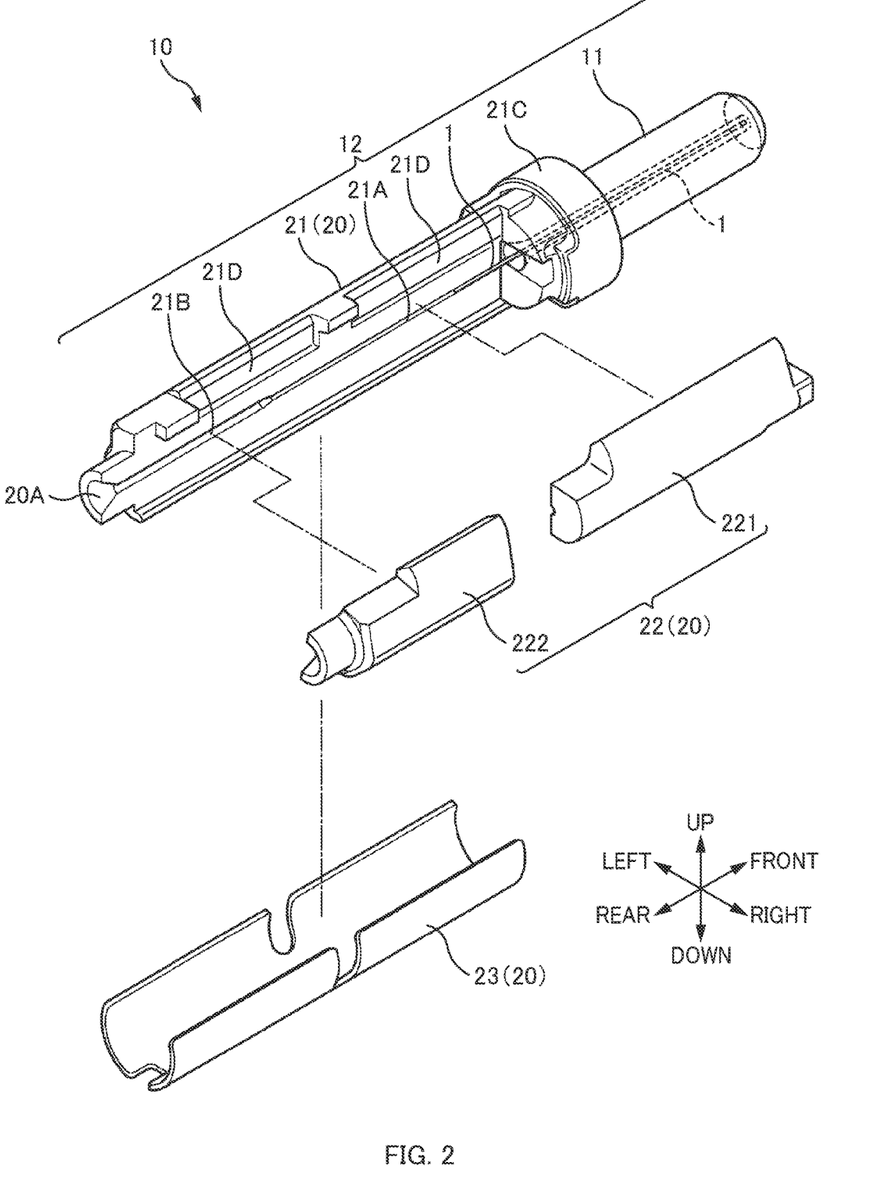
FIG. 2 is an exploded diagram of a clamp-section-attached ferrule 10 according to one or more embodiments.

FIG. 2 is an exploded diagram of a clamp-section-attached ferrule in accordance with one or more embodiments. The clamp-section-attached ferrule 10 includes the ferrule 11 and the clamp section 20.

The ferrule 11 is a member that retains an end portion of the in-built fiber 1. The ferrule 11 is a cylindrical shaped ferrule in this case, which is employed for single fiber optical connectors. One end of the in-built fiber 1 (a front end portion thereof) is bonded and fixed to the ferrule 11, and the end face of the in-built fiber 1 is polished together with the ferrule 11. The other end of the in-built fiber 1 (a rear end portion thereof) is disposed inside the clamp section 20 (or more precisely, in a centering groove 21A of the base member 21).

The clamp section 20 is a member (optical fiber connection device) that axially aligns (centers) the in-built fiber 1 and the insertion fiber 3 using a mechanical splicing method, and also fixes the in-built fiber 1 and the insertion fiber 3. The centering groove 21A is formed in the clamp section 20, and the end face of the in-built fiber 1 and the end face of the insertion fiber 3 are centered by the centering groove 21A. Moreover, the insertion section 20A (insertion port) is formed in the rear end of the clamp section 20, and the insertion fiber 3 is inserted through the insertion section 20A. The clamp section 20 includes the base member 21, the lid member 22, and a clamp spring 23.

The base member 21 is a member including the centering groove 21A for centering optical fibers (the in-built fiber 1 and the insertion fiber 3). The ferrule 11 is fixed to the base member 21. A ferrule structural body 12 is configured by the base member 21 and the ferrule 11. Namely, the clamp-section-attached ferrule 10 is configured by the ferrule structural body 12, the lid member 22, and the clamp spring 23. A flange 21C is formed to the base member 21 (the ferrule structural body 12), and the centering groove 21A is formed at a position more toward the rear than the flange 21C. The centering groove 21A is what is referred to as a V-groove, and an end portion of the in-built fiber 1 is disposed in the centering groove 21A. A covering housing groove 21B extends rearward from the rear end of the centering groove 21A. The covering housing groove 21B is formed as far as the rear end of the base member 21 (the insertion section 20A), and is formed as a larger groove than the centering groove 21A. An end portion of the insertion fiber 3 is inserted through the covering housing groove 21B, and the end portion of the insertion fiber 3 (the bare optical fiber portion 3A) is guided to the centering groove 21A.

The lid member 22 is a member that presses optical fibers toward the centering groove 21A of the base member 21. The lid member 22 includes a press face on the base member 21 side. The press face contacts the optical fiber and presses the optical fiber. In other words, the lid member 22 and the base member 21 configure a gripping member that fixes an optical fiber by sandwiching the optical fiber between the lid member 22 and the base member 21. The lid member 22 is configured from a first lid member 221 and a second lid member 222. The first lid member 221 is a member that presses the bare optical fiber portion 3A. The second lid member 222 is a member that presses the covered portion 3B of the insertion fiber 3.

The clamp spring 23 is a spring member that presses the base member 21 and the lid member 22 so as to pinch the base member 21 and the lid member 22. The clamp spring 23 continuously applies a pressing force so as to pinch the base member 21 and the lid member 22. When the interposer has been inserted into an interposer recess 21D, a gap between the base member 21 and the lid member 22 is opened against the pressing force of the clamp spring 23. This enables the insertion fiber 3 to be inserted into the clamp section 20, and enables the end face of the in-built fiber 1 and the end face of the insertion fiber 3 to be abutted. Moreover, when the interposer has been removed from the interposer recess 21D, the in-built fiber 1 and the insertion fiber 3 are pressed between the base member 21 and the lid member 22 by the pressing force of the clamp spring 23, and are fixed therebetween. Note that the interposer recess 21D, for inserting the wedge shaped interposer into, may be formed to either the base member 21 or the lid member 22, or the interposer recess 21D may be omitted altogether.

<Solid Index-Matching Material C>

Figure 3:
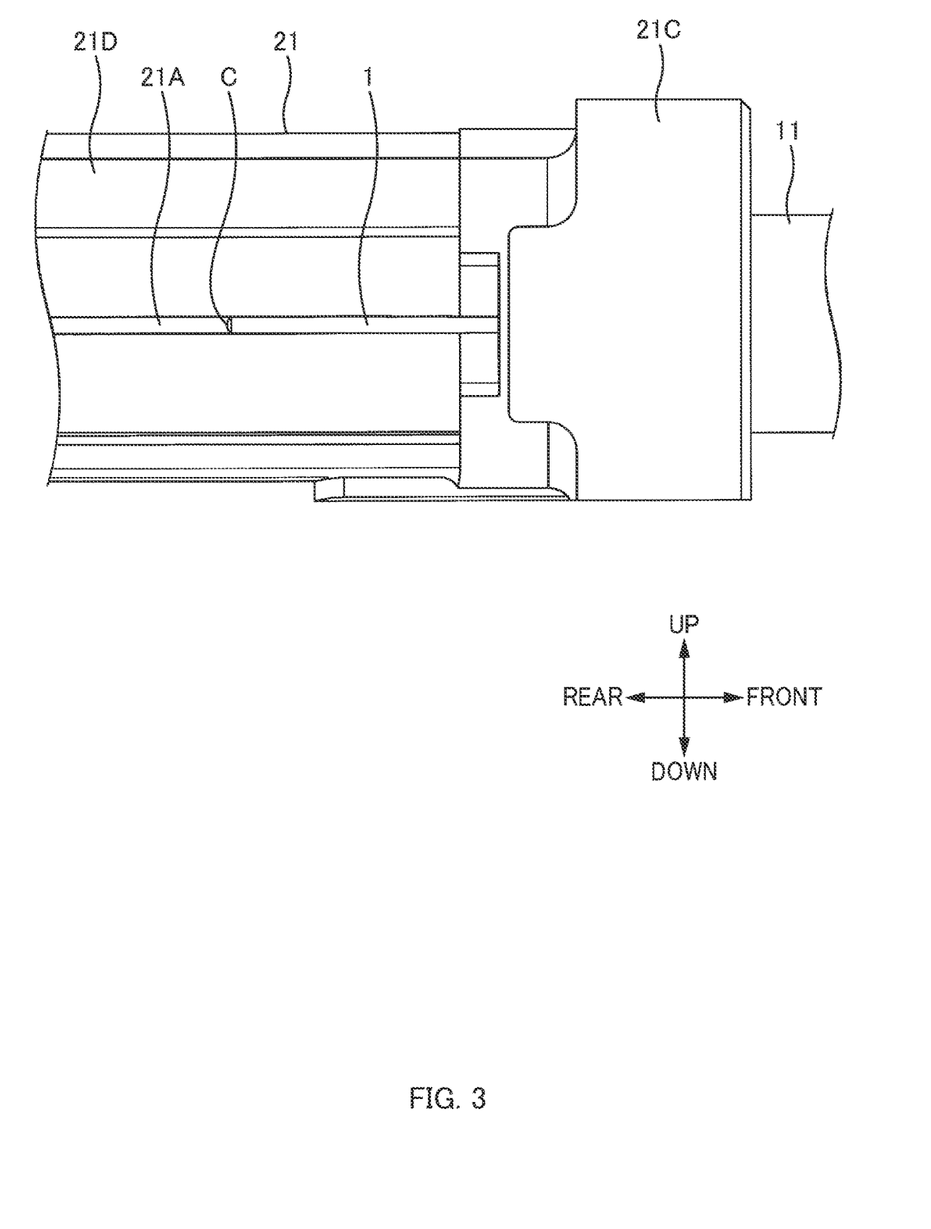
FIG. 3 is a diagram to explain configuration in the vicinity of a rear end face of an in-built fiber 1 according to one or more embodiments.

FIG. 3 is a diagram to explain configuration in the vicinity of the rear end face of an in-built fiber 1 in accordance with one or more embodiments. The solid index-matching material C is provided at the rear end face of the in-built fiber 1. The refractive index of the solid index-matching material C is close to the refractive index of the in-built fiber 1 and the insertion fiber 3. The solid index-matching material C has a high degree of index matching to the in-built fiber 1 and the insertion fiber 3. More specifically, a difference between the refractive index of the solid index-matching material C and the refractive index of the in-built fiber 1 and the insertion fiber 3 is not greater than ±0.1, or not greater than ±0.05. In the case in which the refractive index of the in-built fiber 1 and the refractive index of the insertion fiber 3 are different from each other, the refractive index of the solid index-matching material C lies between the refractive index of the in-built fiber 1 and the refractive index of the insertion fiber 3. Moreover, the difference between the refractive index of the solid index-matching material C and the average value of the refractive index of the in-built fiber 1 and the refractive index of the insertion fiber 3 is not greater than ±0.1 (or not greater than ±0.05).

The solid index-matching material C is elastically deformable. This means that when the end face of the insertion fiber 3 is abutted against the in-built fiber 1, the solid index-matching material C deforms to follow fine irregularities on the end face of the insertion fiber 3, enabling the solid index-matching material C to make reliable contact with the core layer of the insertion fiber 3, and enabling connection loss to be suppressed. Moreover, due to the solid index-matching material C deforming to follow the end face of the insertion fiber 3, a state is achieved in which there is substantially no gap (air bubble) between the solid index-matching material C and the end face of the insertion fiber 3. Moreover, the solid index-matching material C functions as a stress relief member, enabling the alleviation of any impact force when abutting.

Possible substances for the solid index-matching material C include, for example, polymer materials, such as acrylic-based, epoxy-based, vinyl-based, silicone-based, rubber-based, urethane-based, methacrylate-based, NYLON-based, bisphenol-based, diol-based, polyimide-based, fluorinated epoxy-based, and fluorinated acrylic-based polymer materials.

The solid index-matching material C may be formed in the shape of a layer of constant thickness. However, the solid index-matching material C is formed in a convex shape such that a central region of the end face (the core layer or mode field diameter portion thereof) projects more than peripheral edge regions of the solid index-matching material C. This means that when the end face of the insertion fiber 3 is abutted against the in-built fiber 1, the solid index-matching material C can reliably make contact with the core layer of the insertion fiber 3, enabling connection loss to be suppressed.

The solid index-matching material C may be formed on the rear end face of the in-built fiber 1 by the following method, for example.

In an electrostatically charged state of the in-built fiber 1, the end face of the in-built fiber 1 is made to approach the liquid surface of a liquid index-matching material, and the liquid index-matching material is adsorbed (adhered) onto the end face of the in-built fiber 1. The liquid index-matching material is then cured, such that the cured liquid index-matching material becomes the solid index-matching material C. Note that there is no limitation to causing adsorption of the liquid index-matching material by using an electrical method, and the liquid index-matching material may be adhered to the end face of the in-built fiber 1 by another method.

Note that the solid index-matching material C may be provided on the end face of the in-built fiber 1, and a liquid index-matching material may be filled between the end face of the in-built fiber 1 and the end face of the insertion fiber 3. In such cases, a liquid index-matching material may be filled inside the clamp section 20 (into the centering groove 21A) in advance before inserting the insertion fiber 3 therein.

Figure 4A:
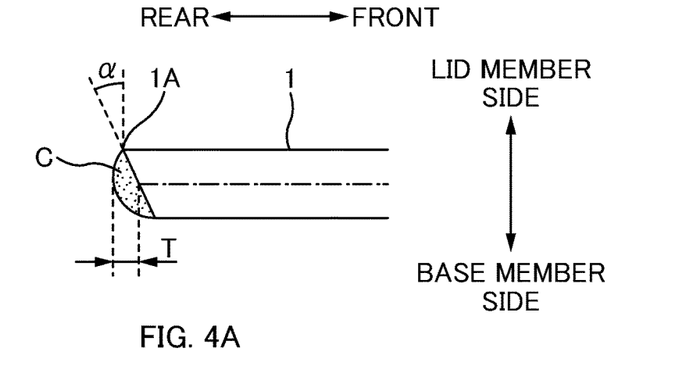
FIG. 4A is an enlarged diagram to explain a rear end face of an in-built fiber 1 and a solid index-matching material C according to one or more embodiments.

FIG. 4A is an enlarged diagram to explain the rear end face of an in-built fiber 1 and the solid index-matching material C in accordance with one or more embodiments.

In one or more embodiments, the rear end face of the in-built fiber 1 is not a face perpendicular to the optical axis (a face perpendicular to the front-rear direction), and is instead inclined with respect to a plane perpendicular to the optical axis. In this case, the rear end face of the in-built fiber 1 is inclined by an angle α with respect to the plane perpendicular to the optical axis. A projecting portion 1A is formed on the rear end face of the in-built fiber 1 due to inclining the rear end face of the in-built fiber 1. The projecting portion 1A projects more toward the rear (toward the insertion fiber 3 side) than a central region of the rear end face of the in-built fiber 1. The solid index-matching material C is provided on the rear end face of the in-built fiber 1 in this manner.

Figure 4B:
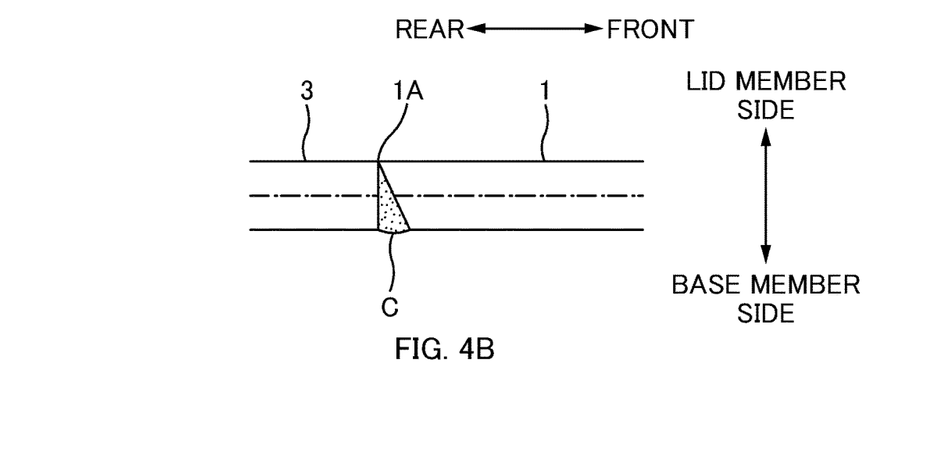
FIG. 4B is a diagram to explain a manner in which an end face of an insertion fiber 3 is abutted against the in-built fiber 1 according to one or more embodiments.

FIG. 4B is a diagram to explain a manner in which the end face of the insertion fiber 3 is abutted against the in-built fiber 1 according to one or more embodiments. When the end face of the insertion fiber 3 makes contact with the projecting portion 1A, further insertion of the insertion fiber 3 is restricted. This secures a predetermined separation between the central region of the rear end face of the in-built fiber 1 (the core layer or mode field diameter portion thereof) and the end face of the insertion fiber 3. This enables the amount of deformation of the solid index-matching material C at the central region of the rear end face of the in-built fiber 1 to be accommodated within a predetermined range. Note that even though there is a predetermined separation at the central region where a gap is open between the in-built fiber 1 and the end face of the insertion fiber 3, connection loss is suppressed due to this being filled by the solid index-matching material C.

Figure 4C:
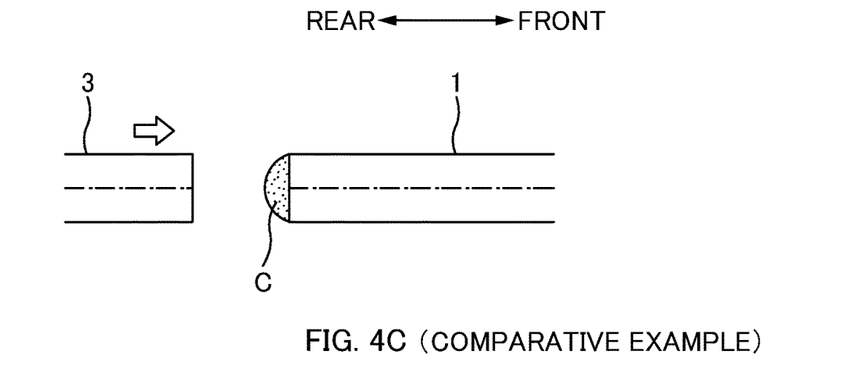
FIG. 4C is a diagram to explain a comparative example.

FIG. 4C is a diagram to explain a comparative example. In the comparative example, the end face of the in-built fiber 1 is a face perpendicular to the optical axis, and the solid index-matching material C is provided on this end face. The end face of the insertion fiber 3 is also a face perpendicular to the optical axis. There is accordingly a large deformation in the solid index-matching material C interposed between the end faces perpendicular to the optical axis when these end faces are abutted against each other. As a result, the original shape of the solid index-matching material C is not maintained, resulting in the desired characteristics of the solid index-matching material C no longer being obtainable. For example, cracks may form in the solid index-matching material C or air bubbles may be incorporated therein, thus modifying the initial characteristics, such as the optical characteristics, of the solid index-matching material C. This gives rise to a concern that long term characteristics, such as reliability and temperature dependent properties, might change along with plastic deformation of the solid index-matching material C.

In comparison to such a comparative example, in one or more embodiments, the rear end face of the in-built fiber 1 includes the projecting portion 1A projecting more toward the rear (toward the insertion fiber 3 side) than the central region (see FIG. 4A). This enables the amount of deformation of the solid index-matching material C at the central region, which will become the optical path of optical signals, to be restricted (see FIG. 4B). The desired characteristics (for example, the initial characteristics or the long term characteristics) of the solid index-matching material C at the central region can thereby be maintained.

The angle α illustrated in FIG. 4A (the angle of the end face with respect to a plane perpendicular to the optical axis) ranges from 4 degrees to 15 degrees, inclusive (in order to emphasize that it is an inclined angle, for the purposes of illustration the angle α is depicted as 15 degrees or over in FIG. 4A). The reason for the above is that when the angle α is less than 4 degrees, the amount of deformation of the solid index-matching material C is large enough to change the characteristics when the end faces are abutted against each other. This is also because when the angle α is greater than 15 degrees, it is difficult to produce an inclined end face, and the distance between the end faces at the central region is too wide. Note that inclined end faces having an angle α of 15 degrees or less can be produced by using a tool to cut the end portion of the optical fiber while torsional stress is being applied to the optical fiber.

As illustrated in FIG. 4A, the solid index-matching material C projects out more toward the rear (toward the insertion fiber 3 side) than the projecting portion 1A at the central region (a core layer or mode field diameter portion). In other words, a thickness T of the solid index-matching material C on the optical axis is greater than the amount by which the projecting portion 1A projects (the projection amount of the projecting portion 1A relative to the position of the end face on the optical axis). This enables the solid index-matching material C to fill the central region between the end faces of the in-built fiber 1 and the insertion fiber 3 (see FIG. 4B), enabling connection loss to be suppressed. Denoting the radius of the in-built fiber 1 as r, then the thickness T is r×tan α or greater. For example, for cases in which the in-built fiber 1 has a diameter of 125 μm, and the angle α is 15 degrees (the maximum value), the solid index-matching material C can be caused to project more toward the rear (toward the insertion fiber 3 side) than the projecting portion 1A so long as the thickness T is 20 μm or greater (more precisely, 16.75 μm or greater).

Figure 5:
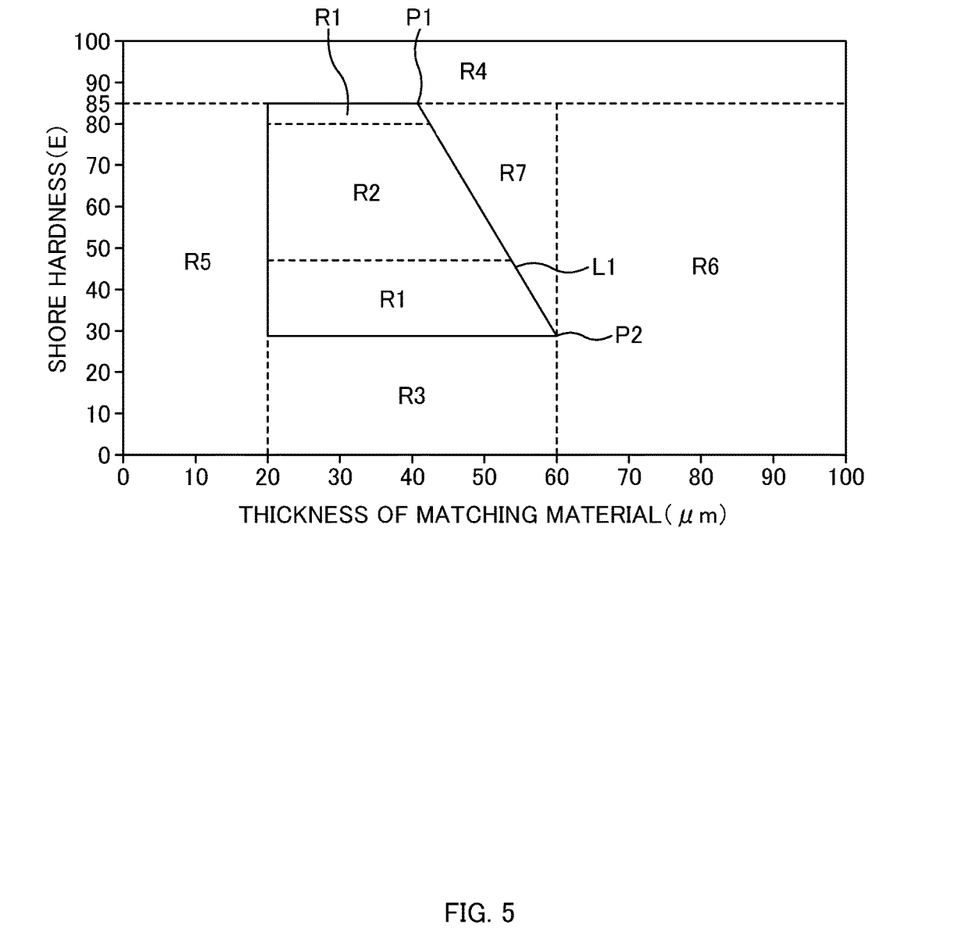
FIG. 5 is a diagram to explain a relationship between a thickness T and hardness of a solid index-matching material C according to one or more embodiments.

FIG. 5 is a diagram to explain a relationship between the thickness T and hardness of the solid index-matching material C in accordance with one or more embodiments. The horizontal axis indicates the thickness T of the solid index-matching material C. Note that the thickness T is a dimension of the solid index-matching material C on the optical axis of the in-built fiber 1 (see FIG. 4A). Moreover, the vertical axis indicates shore hardness E of the solid index-matching material C (according to JIS K6253). As explained below, the solid index-matching material C employed has a thickness and hardness that lie in region R1 or region R2 (the regions surrounded by the bold line).

In a region R3 (a region having a shore hardness E lower than 30), the hardness is too low, and so an effect to alleviate impact due to abutting the insertion fiber 3 is insufficiently obtained. However, even in the case in which a solid index-matching material C in the region R3 is employed, some alleviation of impact when abutting can still be achieved compared to cases lacking the solid index-matching material C.

In a region R4 (a region having a shore hardness E higher than 85), the hardness is too high, and so deformation so as to follow the irregularities on the end face of the insertion fiber 3 is insufficient. However, even in the case in which a solid index-matching material C in the region R4 is employed, a gap between end faces that causes increased connection loss can still be suppressed compared to a case of lacking the solid index-matching material C.

In a region R5 (a region having a thickness of less than 20 μm), due to being too thin, an effect to alleviate impact due to abutting the insertion fiber 3 is insufficiently obtained. Moreover, in the region R5, there is a chance that the solid index-matching material C does not project more toward the rear than the projecting portion 1A. However, even in the case in which a solid index-matching material C in the region R5 is employed, an alleviation of impact when abutting can still be achieved compared to a case of lacking the solid index-matching material C.

In a region R6 (a region having a thickness greater than 60 μm), due to being too thick, it becomes difficult to stabilize the position of the end portion of the insertion fiber 3, giving rise to a concern that the precision of centering might fall. Moreover, in a region R7 (a region on the greater thickness side of a straight line L1 connecting a point P1 and a point P2), it becomes difficult to stabilize the position of the end portion of the insertion fiber 3, giving rise to a concern that the precision of centering might fall. However, even in the case in which a solid index-matching material C in the region R6 or the region R7 is employed, there is still some suppression of a gap between end faces that causes increased connection loss, compared to cases lacking the solid index-matching material C.

Thus, appropriate hardness and thickness of the solid index-matching material C lie in the region R1 and the region R2. Namely, the hardness and thickness of the solid index-matching material C can be set to lie within the range bounded by four points: (thickness: 20 μm, shore hardness E: 30), (thickness: 20 μm, shore hardness E: 85), (thickness: 40 μm, shore hardness E: 85), and (thickness: 60 μm, shore hardness E: 30).

Note that a solid index-matching material C that lies in the region R2 (a region within the region R1 where the shore hardness E is from 45 to 80, inclusive) can be employed when the insertion fiber 3 is a holey optical fiber (for example, a Hole-Assisted Fiber (HAF)). When the insertion fiber 3 is a holey optical fiber, there are holes open in the end face thereof, and the position of the insertion fiber 3 with respect to the in-built fiber 1 is stabilized by the solid index-matching material C entering the holes, giving stable centering precision. In the case in which the hardness of the solid index-matching material C is too low, the position of the insertion fiber 3 is not stable even when the solid index-matching material C enters the holes, and in the case in which the hardness is too high, the solid index-matching material C does not readily enter the holes. Thus, a solid index-matching material C lying in the region R2 can be employed when the insertion fiber 3 is a holey optical fiber.

In one or more embodiments, the projecting portion 1A on the end face of the in-built fiber 1 is formed on the lid member 22 side (the upper side of the drawing in FIG. 4A). The reason for this will now be explained.

Figure 6A:
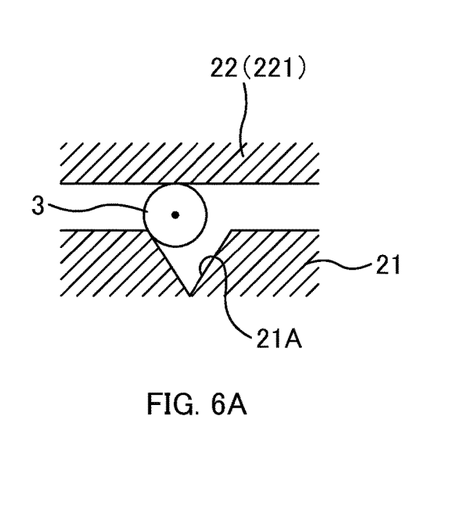
FIG. 6A is diagram to explain a position of an insertion fiber 3 when an interposer is inserted according to one or more embodiments.
Figure 6B:
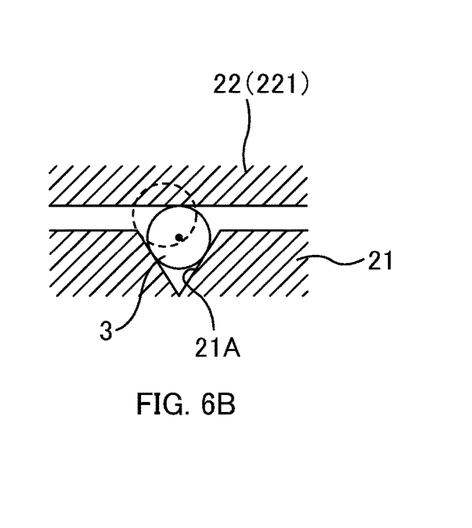
FIG. 6B is a diagram to explain a position of an insertion fiber 3 after removing an interposer according to one or more embodiments.

FIG. 6A is diagram to explain a position of an insertion fiber 3 when an interposer is inserted in accordance with one or more embodiments. FIG. 6B is a diagram to explain a position of an insertion fiber 3 after removing the interposer in accordance with one or more embodiments. As illustrated in FIG. 6A, due to the gap between the base member 21 and the lid member 22 being in an open state when the interposer is inserted, a state can be achieved in which the insertion fiber 3 inserted into the clamp section 20 is lifted away from the centering groove 21A (V-groove) of the base member 21. However, as illustrated in FIG. 6B, when the interposer has been removed, the insertion fiber 3 that was in a state lifted away from the centering groove 21A is positioned in the centering groove 21A of the base member 21. Namely, the insertion fiber 3 may move toward the base member 21 side when the interposer is removed.

Figure 7A:
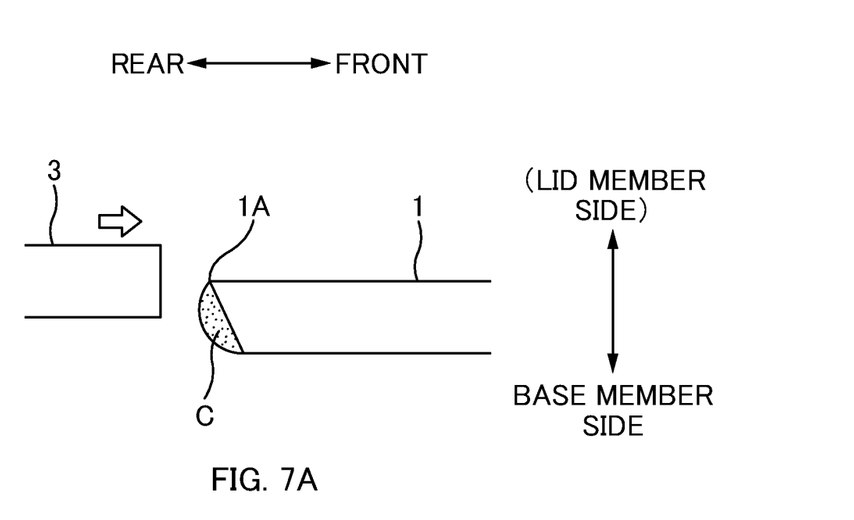
FIG. 7A is a diagram to explain a manner of abutting according to one or more embodiments.
Figure 7B:
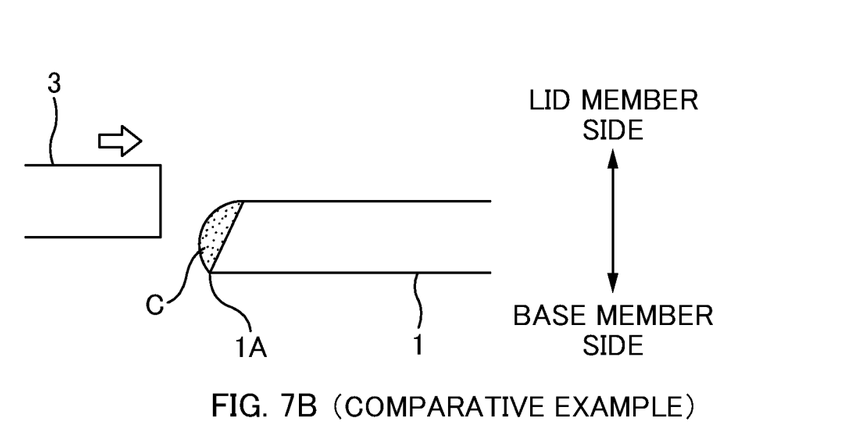
FIG. 7B is a diagram to explain a manner of abutting in a comparative example.

FIG. 7B is a diagram to explain a manner of abutting in a comparative example. In the comparative example, the projecting portion 1A is formed on the base member 21 side of the end face of the in-built fiber 1. This means that when the insertion fiber 3 is abutted against the in-built fiber 1 in a state lifted away from the centering groove 21A of the base member 21 (see FIG. 6A), due to the projecting portion 1A being in a position displaced from the end face of the insertion fiber 3, the edge of the end face of the insertion fiber 3 will bite into the solid index-matching material C giving rise to a concern regarding damage to the solid index-matching material C. Moreover, when the interposer is removed, due to the insertion fiber 3 moving toward the base member 21 side in a state in which the edge of the end face of the insertion fiber 3 is biting into the solid index-matching material C, there is concern that the solid index-matching material C might be damaged even more.

FIG. 7A is a diagram to explain a manner of abutting according to one or more embodiments. In one or more embodiments, due to the projecting portion 1A being formed on the lid member 22 side of the end face of the in-built fiber 1, the projecting portion 1A can be caused to abut the end face of the insertion fiber 3 even in a state in which the insertion fiber 3 is lifted away from the centering groove 21A of the base member 21 (see FIG. 6A). This means that the edge of the end face of the insertion fiber 3 is not liable to bite into the solid index-matching material C. Moreover, since the projecting portion 1A is able to abut the end face of the insertion fiber 3 even when the interposer is removed, damage to the solid index-matching material C can be suppressed.

Figure 8A:
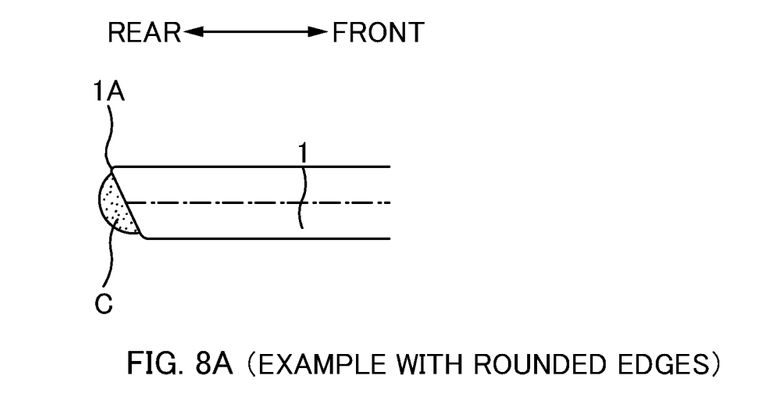
FIG. 8A is an enlarged diagram to explain a rear end face of an in-built fiber 1 and a solid index-matching material C according to one or more embodiments.

FIG. 8A is an enlarged diagram to explain a rear end face of an in-built fiber 1 and a solid index-matching material C according to one or more embodiments. Explanation will be omitted of configuration similar to that of the optical connector 100, the clamp section 20, and the like.

In one or more embodiments, edges of the inclined rear end face of the in-built fiber 1 are rounded over, and the edge of the projecting portion 1A is rounded over. For example, after forming the inclined end face by cutting the end portion of the in-built fiber 1, the edge of the rear end face is rounded by subjecting the inclined end face to an arc discharge so as to melt part of the edge of the end face, enabling the edge of the projecting portion 1A to be rounded over. Then, in one or more embodiments, a solid index-matching material C is provided to the inclined end face that has been rounded at the edges in this manner.

In one or more embodiments, due to the rear end face of the in-built fiber 1 including the projecting portion 1A that projects more toward the rear (toward the insertion fiber 3 side) than the central region, the amount of deformation of the solid index-matching material C at the central region, which will be the optical path of optical signals, can be restricted. Moreover, in one or more embodiments, due to rounding over of the projecting portion 1A that projects more toward the rear (toward the insertion fiber 3 side) of the central region, impact can be alleviated when the projecting portion 1A contacts the end face of the insertion fiber 3 during abutting.

Figure 8B:
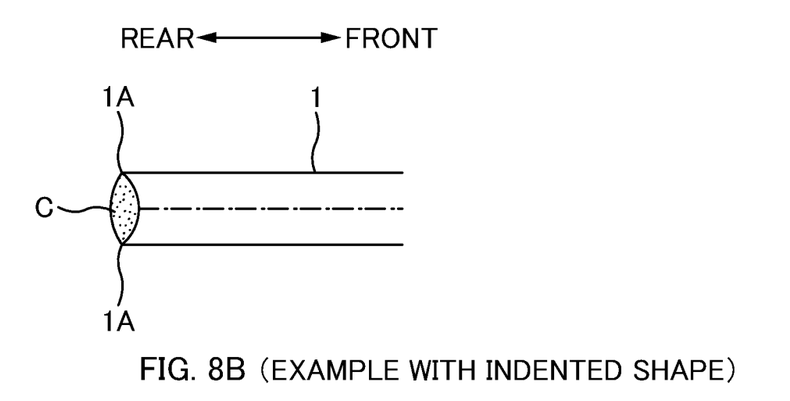
FIG. 8B is an enlarged diagram to explain a rear end face of an in-built fiber 1 and a solid index-matching material C according to one or more embodiments.

FIG. 8B is an enlarged diagram to explain a rear end face of an in-built fiber 1 and a solid index-matching material C according to one or more embodiments. In one or more embodiments, the projecting portion 1A is formed projecting more toward the rear than the central region by forming an indentation at the central region of the rear end face. The indentation in the central region of the rear end face may be dish shaped, or may be shaped as a groove along the up-down direction or the left-right direction. In other words, the projecting portion 1A may be formed in a circular ring shape running around the edge of the rear end face, or may be formed in two locations, on either side of the central region in the left-right direction or the up-down direction. Then, in one or more embodiments, the solid index-matching material C is provided to the central region of such a rear end face.

In one or more embodiments, due to the rear end face of the in-built fiber 1 including the projecting portion 1A projecting more toward the rear (toward the insertion fiber 3 side) than the central region, the amount of deformation of the solid index-matching material C at the central region, which will be the optical path of optical signals, can be restricted. Moreover, one or more embodiments have the advantage of the in-built fiber 1 and the insertion fiber 3 not being liable to bend during abutting due to the projecting portion 1A being disposed symmetrically (either with line symmetry or point symmetry) to the optical axis. Note that in one or more embodiments, the projecting portion 1A may be rounded over.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Note that although the optical connector 100 described above is an on-site-assembly type optical connector, which includes an SC type optical connector, another optical connector may be employed therefor. Moreover, although the optical fiber connection device described above is the clamp section 20 employed in the optical connector 100 and in the clamp-section-attached ferrule 10, the optical fiber connection device may, for example, be a mechanical splicer device that abuts end faces of optical fibers against each other and fixes them.

REFERENCE SIGNS LIST

1: in-built fiber (first optical fiber),
1A: projecting portion,
3: insertion fiber (second optical fiber),
3A: bare optical fiber portion,
3B: covered portion (fiber portion),
5: optical cable,
10: clamp-section-attached ferrule,
11: ferrule,
12: ferrule structural body,
20: clamp section (mechanical splicer section),
20A: insertion section,
21: base member,
21A: centering groove,
21B: covering housing groove,
21C: flange,
21D: interposer recess,
22: lid member,
221: first lid member,
222: second lid member,
23: clamp spring,
31: front-side housing (plug frame),
32: rear-side housing,
32A: insertion support slider,
32B: cover,
33: spring,
34: grip,
40: external covering gripping member,
100: optical connector (on-site-assembly type of optical connector),
C: solid index-matching material.

The invention claimed is:

1. An optical connector comprising:
a ferrule;
a first optical fiber retained in the ferrule;
a clamp section including an insertion section where a second optical fiber is inserted;
a solid index-matching material disposed on an end face of the first optical fiber on an insertion section side; and
a projecting portion on the end face of the first optical fiber and that projects more toward the insertion section side than a central region of the end face, wherein
the clamp section centers and fixes the first optical fiber and the second optical fiber,
the clamp section further includes a base member including a centering groove, and a lid member that presses the first optical fiber and the second optical fiber toward the centering groove,
an end of the first optical fiber is disposed in the centering groove, and
the projecting portion is disposed at a lid member side as viewed from the central region.

2. The optical connector according to claim 1, wherein the end face of the first optical fiber is inclined with respect to a plane perpendicular to an optical axis.

3. The optical connector according to claim 2, wherein the end face of the first optical fiber is inclined at an angle of from 4 degrees to 15 degrees, inclusive, with respect to the plane perpendicular to the optical axis.

4. The optical connector according to claim 1, wherein a central region of the solid index-matching material projects out further than a peripheral edge region of the solid index-matching material.

5. The optical connector according to claim 4, wherein the solid index-matching material projects more toward the insertion section side than the projecting portion.

6. The optical connector according to claim 1, wherein an edge of the projecting portion is rounded over.

7. The optical connector according to claim 1, wherein a thickness of the solid index-matching material on an optical axis of the first optical fiber is 20 µm or greater.

8. The optical connector according to claim 7, wherein the thickness and a hardness of the solid index-matching material lies within a range bounded by four points: (thickness: 20 µm, shore hardness E: 30), (thickness: 20 µm, shore hardness E: 85), (thickness: 40 µm, shore hardness E: 85), and (thickness: 60 µm, shore hardness E: 30).

9. An optical fiber connection device comprising:
a base member including a centering groove that centers an end face of a first optical fiber and an end face of a second optical fiber;
a lid member that presses the first optical fiber and the second optical fiber toward the centering groove;
an insertion section where the second optical fiber is inserted;
a solid index-matching material disposed on an end face of the first optical fiber on the insertion section side; and
a projecting portion on the end face of the first optical fiber and that projects more toward the insertion section side than a central region of the end face, wherein
an end of the first optical fiber is disposed in the centering groove, and
the projecting portion is disposed at a lid member side as viewed from the central region.

10. An optical connector manufacturing method comprising:
providing an unassembled optical connector that includes a ferrule, a first optical fiber retained in the ferrule, and a clamp section including an insertion section, a base member, and a lid member;
inserting a second optical fiber into the clamp section through the insertion section;
abutting an end face of the first optical fiber, disposed in a centering groove of the base member, and an end face of the second optical fiber against each other; and
fixing the first optical fiber and the second optical fiber using the clamp section, by pressing the first optical fiber and the second optical fiber toward the centering groove with the lid member, after the first optical fiber and the second optical fiber have been abutted against each other, wherein
a solid index-matching material is disposed on an end face of the first optical fiber on an insertion section side,
a projecting portion on the end face of the first optical fiber projects more toward the insertion section side than a central region of the end face, and
the projecting portion is disposed at a lid member side as viewed from the central region.

11. An optical fiber connection method comprising:
abutting an end face of a first optical fiber, disposed in a centering groove of a base member of a clamp section including the base member and a lid member, and an end face of a second optical fiber against each other, wherein the second optical fiber is inserted into the clamp section through an insertion section of the clamp section; and fixing the first optical fiber and the second optical fiber using the clamp section, by pressing the first optical fiber and the second optical fiber toward the centering groove with the lid member, after the first optical fiber and the second optical fiber have been abutted against each other, wherein a solid index-matching material is disposed on an end face of the first optical fiber on an insertion section side, a projecting portion formed on the end face of the first optical fiber projects more toward the insertion section side than a central region of the end face, and the projecting portion is disposed at a lid member side as viewed from the central region.

* * * * *